US009465751B2

(12) United States Patent
Jiang et al.

(10) Patent No.: US 9,465,751 B2
(45) Date of Patent: Oct. 11, 2016

(54) EFFICIENT LOCKING OF MEMORY PAGES

(75) Inventors: Xiaowei Jiang, Hillsboro, OR (US);
Hongliang Gao, Hillsboro, OR (US);
Zhen Fang, Hillsboro, OR (US);
Srihari Makineni, Portland, OR (US);
Ravishankar Iyer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 106 days.

(21) Appl. No.: 13/996,438

(22) PCT Filed: Mar. 30, 2012

(86) PCT No.: PCT/US2012/031651
§ 371 (c)(1),
(2), (4) Date: Jun. 20, 2013

(87) PCT Pub. No.: WO2013/147882
PCT Pub. Date: Oct. 3, 2013

(65) Prior Publication Data
US 2013/0311738 A1 Nov. 21, 2013

(51) Int. Cl.
*G06F 12/12* (2006.01)
*G06F 12/14* (2006.01)
*G06F 12/10* (2016.01)

(52) U.S. Cl.
CPC ....... *G06F 12/1466* (2013.01); *G06F 12/1027* (2013.01); *G06F 12/126* (2013.01)

(58) Field of Classification Search
CPC .. G06F 12/12; G06F 12/126; G06F 12/1466; G06F 12/1027
USPC .......................................... 711/163, 164, 170
See application file for complete search history.

(56) References Cited

U.S. PATENT DOCUMENTS

| 6,957,315 | B2 | 10/2005 | Chauvel |
| 7,426,626 | B2 | 9/2008 | Augsburg et al. |
| 7,849,291 | B2 * | 12/2010 | Hansen ..................... G06F 9/30 712/220 |
| 8,392,664 | B2 * | 3/2013 | Comparan et al. ........... 711/142 |
| 8,812,822 | B2 * | 8/2014 | Luick .................... G06F 9/3824 712/215 |
| 2005/0172292 | A1 * | 8/2005 | Yamada et al. ............... 718/105 |
| 2007/0226795 | A1 * | 9/2007 | Conti et al. ..................... 726/22 |
| 2009/0254774 | A1 | 10/2009 | Chamdani et al. |
| 2009/0282197 | A1 * | 11/2009 | Comparan et al. ........... 711/142 |
| 2011/0145447 | A1 | 6/2011 | Dimond |
| 2015/0089156 | A1 * | 3/2015 | Clohset .................... G06T 1/60 711/141 |

OTHER PUBLICATIONS

Mereu, Gianni. "Conception, Analysis, Design and Realization of a Multi-socket Network-on-Chip Architecture and of the Binary Translation support for VLIW core targeted to Systems-on-Chip", Mar. 2007, 145 pages, http://www.diee.unica.it/driei/tesi/19.sub.--mereu.pdf.*
PCT International Search Report for PCT Counterpart Application No. PCT/US2012/031651, 5 pgs., (Nov. 23, 2012).
PCT Written Opinion of the International Searching Authority for PCT Counterpart Application No. PCT/US2012/031651, 6 pgs., (Nov. 23, 2012).

* cited by examiner

*Primary Examiner* — Pierre-Michel Bataille
(74) *Attorney, Agent, or Firm* — Nicholson De Vos Webster & Elliott LLP

(57) ABSTRACT

An apparatus is described that contains a processing core comprising a CPU core and at least one accelerator coupled to the CPU core. The CPU core comprises a pipeline having a translation look aside buffer. The CPU core comprising logic circuitry to set a lock bit in attribute data of an entry within the translation look-aside buffer entry to lock a page of memory reserved for the accelerator.

18 Claims, 10 Drawing Sheets

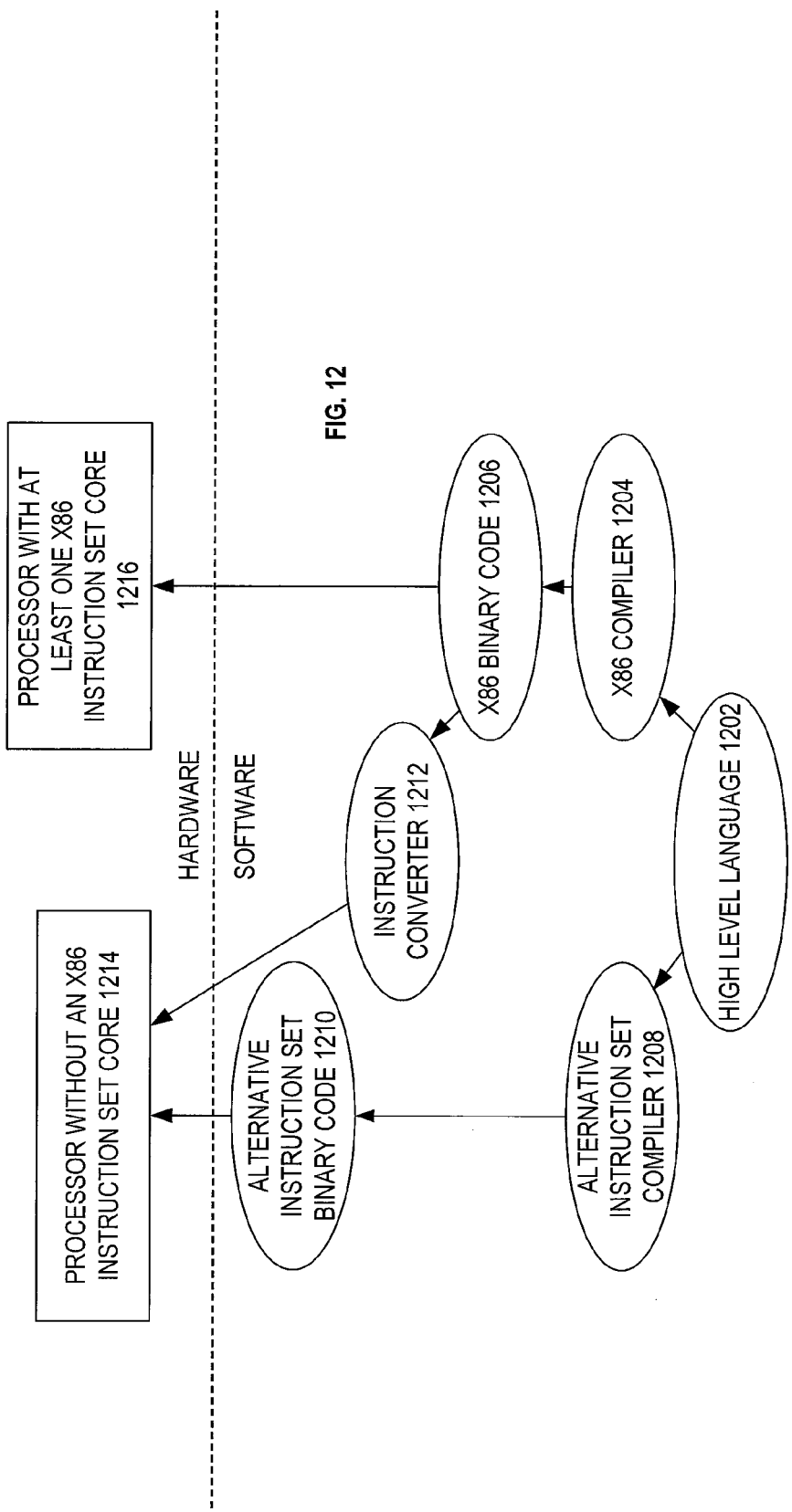

EFFICIENT LOCKING OF MEMORY PAGES

CROSS-REFERENCE TO RELATED APPLICATION

This patent application is a U.S. National Phase Application under 35 U.S.C. §371 of International Application No. PCT/US2012/031651, filed Mar. 30, 2012, entitled EFFICIENT LOCKING OF MEMORY PAGES.

FIELD OF INVENTION

The field of invention relates generally to the computing system design, and, more specifically, to efficient locking of memory pages.

BACKGROUND

Traditional Integration of Co-Processors

As semiconductor manufacturing processes are reaching an era that approaches 1 trillion transistors per die, design engineers are presented with the issue of how to most effectively put to use all the available transistors. One design approach is to implement specific computation intensive functions with dedicated hardware "acceleration" on die along with one or more general purpose CPU cores.

Acceleration is achieved with dedicated logic blocks designed to perform specific computation intensive functions. Migrating intensive computations to such dedicated logic blocks frees the CPU core(s) from executing significant numbers of instructions thereby increasing the effectiveness and efficiency of the CPU core(s).

Although "acceleration" in the form of co-processors (such as graphics co-processors)) are known in the art, such traditional co-processors are viewed by the OS as a separate "device" (within a larger computing system) that is external to the CPU core(s) that the OS runs on. These co-processors are therefore accessed through special device driver software and do not operate out of the same memory space as a CPU core. As such, traditional co-processors do not share or contemplate the virtual addressing-to-physical address translation scheme implemented on a CPU core.

Moreover, large latencies are encountered when a task is offloaded by an OS to a traditional co-processor. Specifically, as a CPU core and a traditional co-processor essentially correspond to separate, isolated sub-systems, significant communication resources are expended when tasks defined in the main OS on a GPP core are passed to the "kernel" software of the co-processor. Such large latencies favor system designs that invoke relatively infrequent tasks on the co-processor from the main OS but with large associated blocks of data per task. In effect, traditional co-processors are primarily utilized in a coarse grain fashion rather than a fine grain fashion.

As current system designers are interested in introducing more acceleration into computing systems with finer grained usages, a new paradigm for integrating acceleration in computing systems is warranted.

BRIEF DESCRIPTION OF THE DRAWINGS

The present invention is illustrated by way of example and not limitation in the figures of the accompanying drawings, in which like references indicate similar elements and in which:

FIG. 12 shows a software instruction converter.

DETAILED DESCRIPTION

Figure 1:
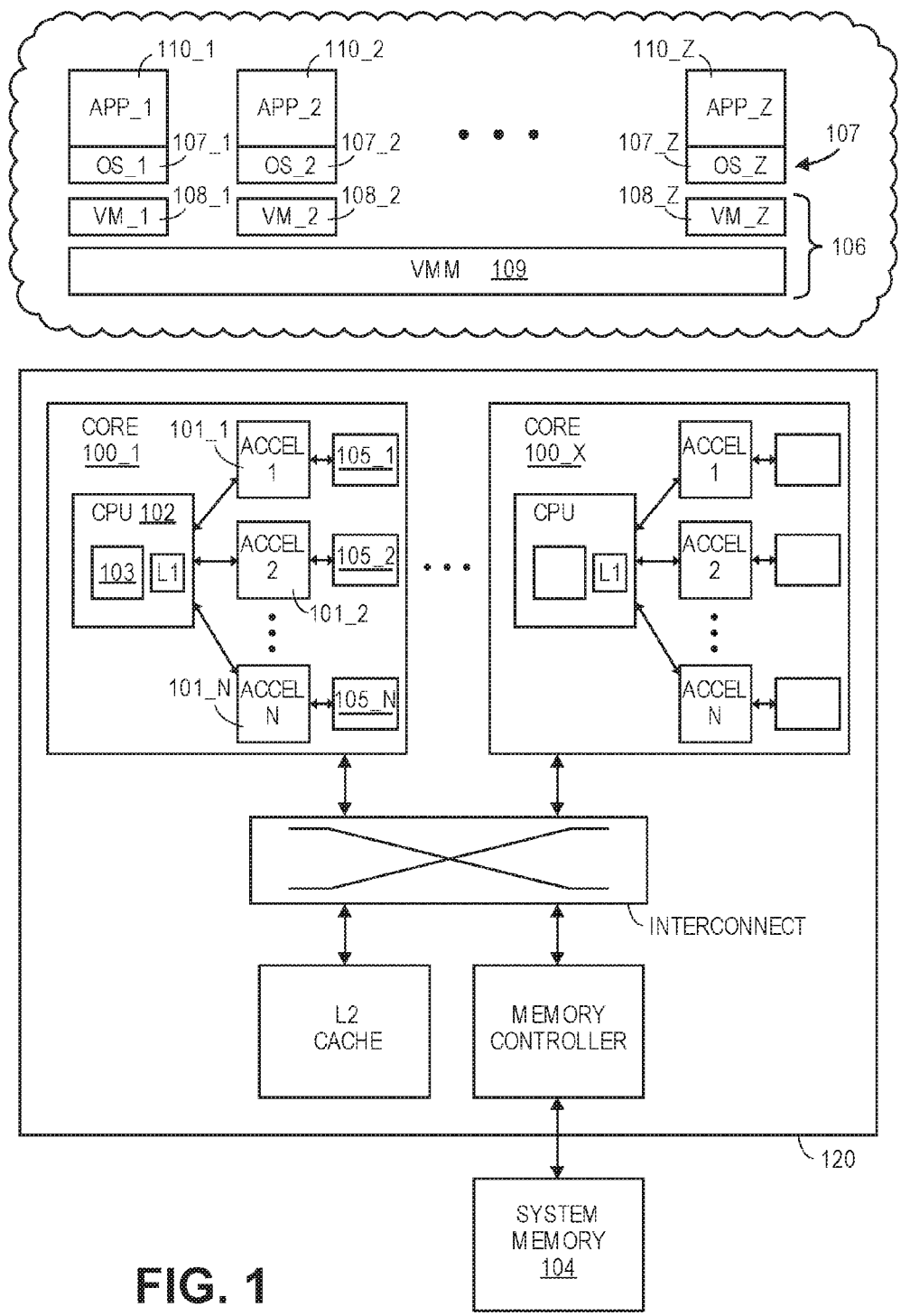
FIG. 1 shows a computing system whose processing cores each include a general purpose processing core and accelerators that are tightly coupled to the general purpose processing core.

FIG. 1 shows new processing core 100_1 architecture in which accelerators 101_1 to 101_N are designed akin to large scale functional units coupled to the core's traditional general purpose CPU (or, more generically, "CPU core" or "CPU") 102 which has one or more general purpose instruction execution pipelines 103. Multiple such cores 100_1 to 100_X may be disposed on a single processor 120 disposed on a semiconductor chip as observed in FIG. 1. Larger computer systems may be constructed by coupling multiple ones of processor 120 together (e.g., through ports of respective interconnect circuitry residing between a processor's cores and cache and memory controller).

Here, standard instructions are read from memory and executed by the core's traditional functional units in the CPU core 102. Other types of instructions that are received by the processing core 100_1, however, will trigger an accelerator into action. In a particular implementation, the underlying hardware supports the software's ability to call out a specific accelerator in code. That is, a specific command can be embodied into the code by the software programmer (or by a compiler), where, the specific command calls out and defines the input operand(s) for a specific accelerator unit.

The command is ultimately represented in some form of object code. During runtime, the underlying hardware "executes" the object code and, in so-doing, invokes the specific accelerator with the associated input data.

Upon being invoked, the accelerator operates out of the same memory space as the CPU core 102. As such, data operands may be identified to the accelerator with virtual addresses whose corresponding translation into physical address space is the same as those used by the CPU core 102. Moreover, generally, the execution time of an accelerator unit's execution of a command is longer than that of a traditional/standard instruction (owing to the complex nature of the tasks being performed). The input operand(s) and/or resultant may also be larger than the standard register sizes of the instruction execution pipeline(s) within the CPU 102.

An accelerator can therefore be generally viewed as being coarser grained (having larger execution times and/or operating on larger data chunks) than the traditional functional units and instructions of the CPU 102. At the same time, an accelerator can also generally be viewed as being finer grained, or at least more tightly coupled to the CPU core 102 than a traditional co-processor.

Specifically, the avoidance of a time expensive "driver call" in order to invoke the accelerator and/or the sharing of same memory space by the accelerator and general purpose CPU 102 corresponds to tighter coupling to the between the general purpose CPU 102 and accelerator as compared to that of a traditional co-processor. Moreover, the specific individual tasks that the accelerators are called on to perform may also be more fine grained than the larger, wholesale tasks traditionally performed by a co-processor. Specific individual tasks that are suitable for implementation with an accelerator as a single "invokable" operation include texture sampling, motion search or motion compensation, security related computations (e.g., cryptography, encryption, etc.), specific financial computations, and/or specific scientific computations.

Often, the processor core 102 will support the execution of a virtual machine monitor (VMM) 109 that itself supports the instantiation of multiple virtual machines 108_1 through 108_Z that each support at least one of its own operating system instances 107_1 through 107_Z which turn each support at least one application software program 110_1 through 110_Z

As is understood in the art, memory locations within system memory can be organized into "pages", where, each page has a virtual address that is referred to by operating program code. The virtual address space can be larger than the actual physical address space of the system memory of the computing system that the program code is operating upon. An operating system (OS), virtual machine (VM) and/or virtual machine monitor (VMM), or any combination thereof, all hereinafter referred to as an OS for convenience, manages the mapping of the virtual address space to the physical address space.

With the virtual address space typically being much larger than the physical address space, pages of content that correspond to specific virtual addresses are frequently swapped into physical system memory addresses (e.g., from deeper, e.g., non volatile, storage) at the expense of other pages (that correspond to other virtual addresses) of content that are swapped out of physical system memory. Conceivably, a same page of content could be swapped into a first address of physical memory, swapped back out to deeper storage and later in time swapped back into a second address of physical memory, where, the first and second physical address are different.

The OS is responsible for controlling the swapping of pages in and out physical system memory, and, keeping track of the corresponding changes to the virtual to physical address translations that arise as a natural consequence of the page swapping activity.

Figure 2:
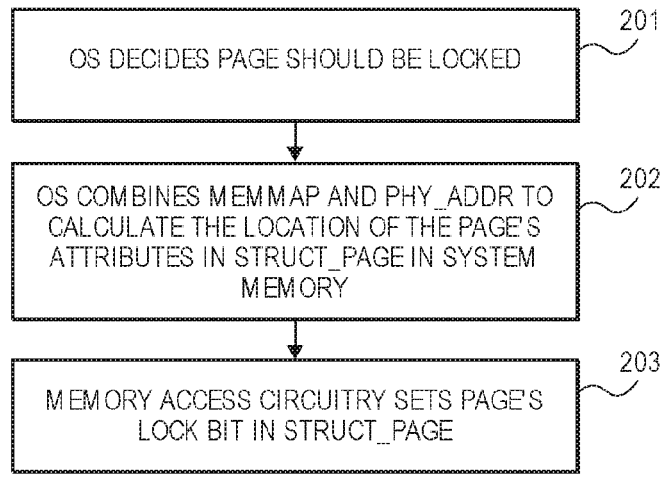
FIG. 2 shows a prior art process for locking a page of memory.

In a common situation, the OS will "lock" the memory pages reserved for the use of an accelerator. By locking a page, the computing system effectively ensures that the accelerator will have that page to operate out of when the accelerator is invoked. Commonly, more than one page may be locked and reserved for the use of an accelerator. FIG. 2 shows a prior art process by which an OS and the underlying CPU hardware locks a memory page.

According to the process of FIG. 2, the OS decides that a page should be locked 201. The OS maintains elsewhere in memory an array-like data structure ("STRUCT_PAGE") where attributes are kept for each page in system memory. STRUCT_PAGE is organized into system memory such that the address for the set of attributes for any specific page is MEMMAP+PHYS_ADDR where MEMMAP is a value that is maintained by the OS, and, PHYS_ADDR is the physical address resulting from a virtual to physical address translation of the page's virtual address.

In response to the decision to the lock the page 201, the OS determines the address of the page's set of attributes in STRUCT_PAGE by fetching the value of MEMMAP, obtaining the page's PHYS_ADDR by effecting a virtual to physical address translation form the page's virtual address, and, adding the MEMMAP value to the PHYS_ADDR value 202. Once the address for the page's attributes has been calculated 202, the OS issues a lock instruction to set a "lock bit" in the page's attributes that indicates the page is locked 203. Specifically, the OS issues an instruction that includes the just calculated address 203 of the page's attributes as an input operand and, when executed, causes the underlying CPU hardware to execute an atomic micro-op that physically sets the lock bit in STRUCT_PAGE within system memory.

Over the course of subsequent operation, the OS continues to manage the swapping in/out of pages to/from physical system memory. As part of this aspect of OS processing, referring to FIG. 3, the OS may target the locked page for eviction from system memory 301. As such, the OS's standard page eviction process includes again calculating 302 the address of the page's address in STRUCT_PAGE (as in process 202), and issuing another instruction that causes the CPU hardware to read the value of the locked bit in the page's attributes in STRUCT_PAGE 303. If the page is still locked 304, the OS understands it has to target another page for eviction from system memory 305. If the page has been unlocked since it was locked 304, the OS swaps the page out of system memory in favor of another page 306.

Traditionally, a co-processor and its associated locked memory page(s) have been implemented as a quasi-permanent fixture in a computing system. That is, traditionally a math co-processor or graphics co-processor (e.g., GPU) would be "enabled" and its memory pages "locked" as part of the normal boot up process of the computer upon power on and/or system reset events. Under normal operation, the co-processor would remain enabled and its associated memory pages remain locked until shutdown, reset or power off of the computer.

With a newer paradigm of acceleration coming into play, accelerators are expected to be enabled/disabled much more frequently. For example, a specific accelerator may be enabled to assist a specific task/application (e.g., that itself is being activated), then be disabled (e.g., to provide memory space for another accelerator whose actual use is more immediate and/or the specific task/application is idled, closed or does not imminently need the accelerator), then be enabled again upon a new need for the accelerator (e.g., a new task is being executed that depends on the same accelerator). The memory pages that are associated with the accelerator and locked as a consequence are likewise expected to be locked and unlocked at a much more frequent pace than what was typical of a co-processor within a traditional computing system.

Figure 3:
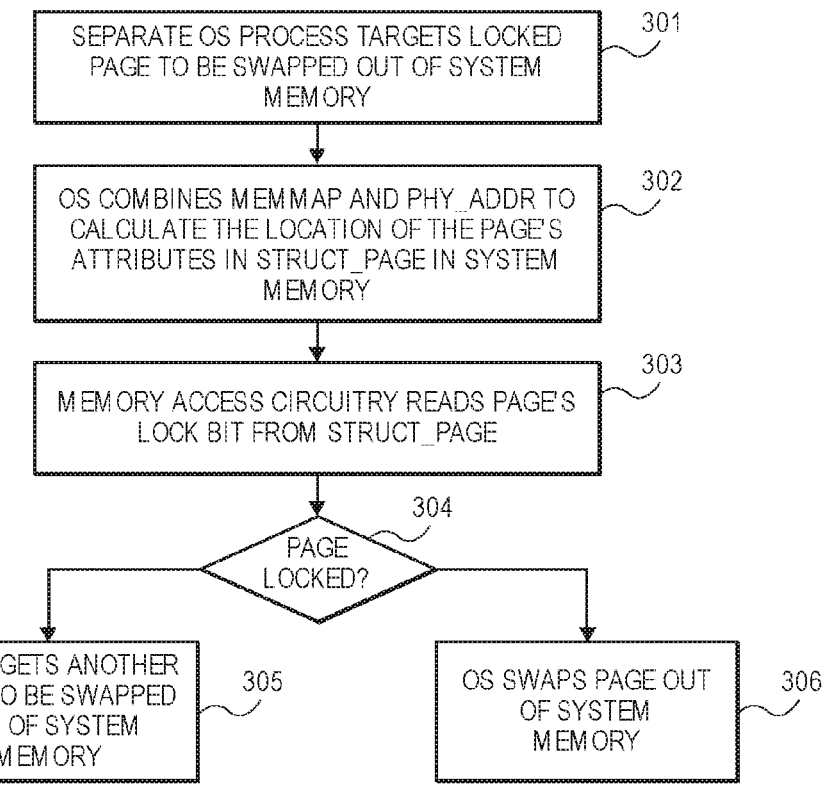
FIG. 3 shows a prior art process for swapping a page out of memory.
Figure 4:
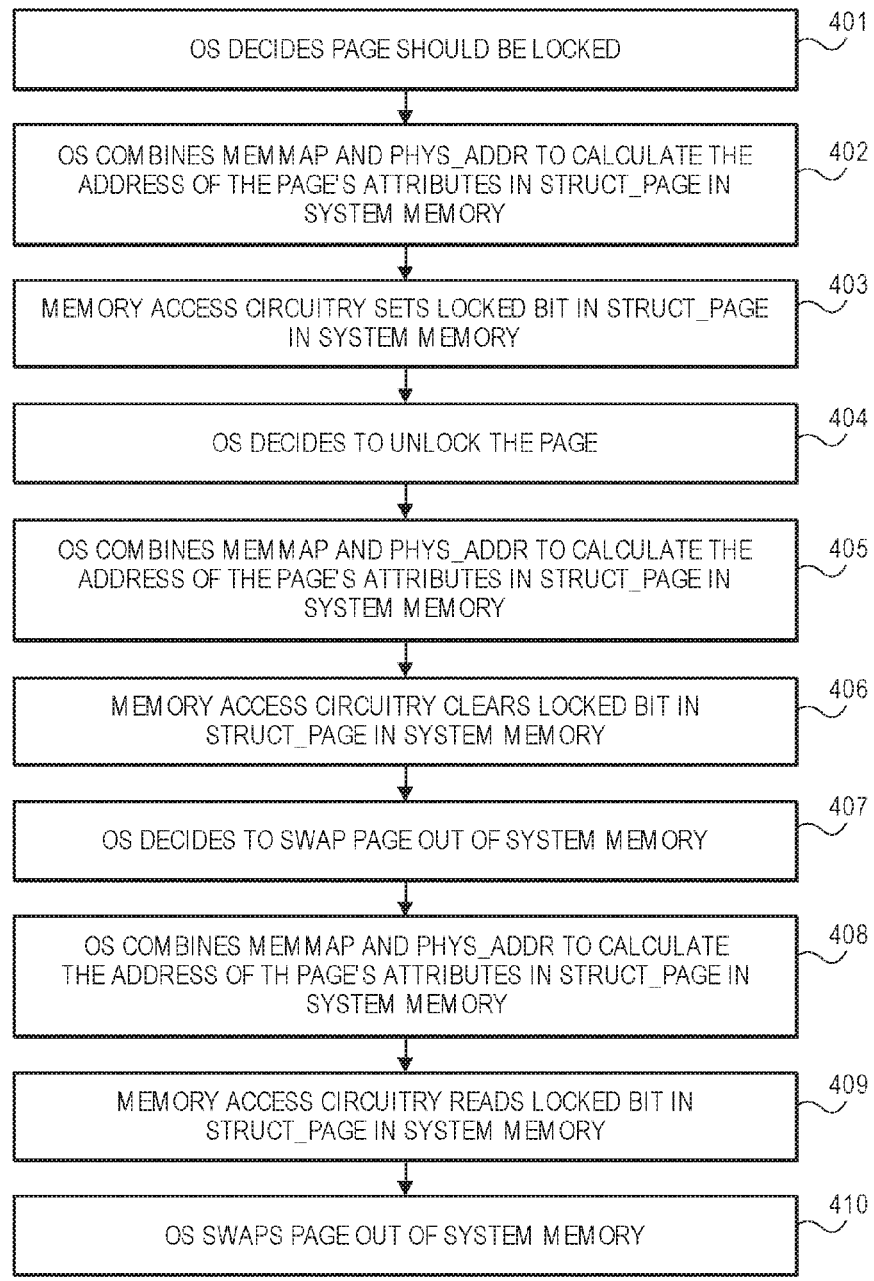
FIG. 4 shows an inefficiency when the processes of FIGS. 2 and 3 are merged.

Inefficiency can result if the standard mechanism for locking/unlocking pages is not improved. An example of such inefficiency is observed in FIG. 4. FIG. 4 shows a process in which the page is unlocked prior to the OS targeting the page for swapping out from system memory. That is, FIG. 3 shows a more detailed examination of process string 201-202-203 of FIG. 2 in combination with process string 301-302-303-304-306 of FIG. 3.

Referring to FIG. 4, as in FIG. 2, the OS decides to lock a page 401, calculates the address where the page's attributes are located in STRUCT_PAGE in system memory 402 and issues an instruction that causes the locked bit to be set in the page's attributes 403. Processes 401 through 403 may represent, for example, the locking of a page that is associated with a freshly enabled accelerator.

At process 404, the OS decides to unlock the page. As such, the address where the page's attributes are found is recalculated 405 and an instruction is executed 406 that causes the CPU hardware to unlock the locked bit that was set in process 403. Process sequence 404-406 may correspond, for example, to the unlocking of the page(s) associated with the disablement of the accelerator whose prior enablement causes the locking of the same page(s) in processes 401-403.

Subsequent to the unlocking of the page(s) 406, the OS decides to swap the page out 407. As such, the OS again calculates the address of where its locked bit is located in STRUCT_PAGE 408 (e.g., by translating the page's virtual address to its PHYS_ADDR and combining it with MEM-MAP) and causes the CPU hardware to read the locked bit from the page's attributes in STRUCT_PAGE 409. In seeing that the unlocked bit is not set in the attributes of STRUCT_PAGE (i.e., is not locked because of process 406), the OS causes the page to be swapped out of memory 410.

Inefficiency is observed in the process of FIG. 4 in that at least two unnecessary accesses to STRUCT_PAGE in system memory are made (to set the lock bit 403 and unset the lock bit 406). Both of these accesses are time consuming and eat away at overall CPU performance, yet, because the page was unlocked 406 before the OS targeted it to be swapped out 407, the locking/unlocking activity 403/406 was in effect of no consequence. That is, for example, in the particular circumstance where the page's associated accelerator is disabled before the OS decides to target the page to be swapped out of system memory, the page need not have been locked and then unlocked (i.e., it could have remained unlocked throughout).

Figure 5:
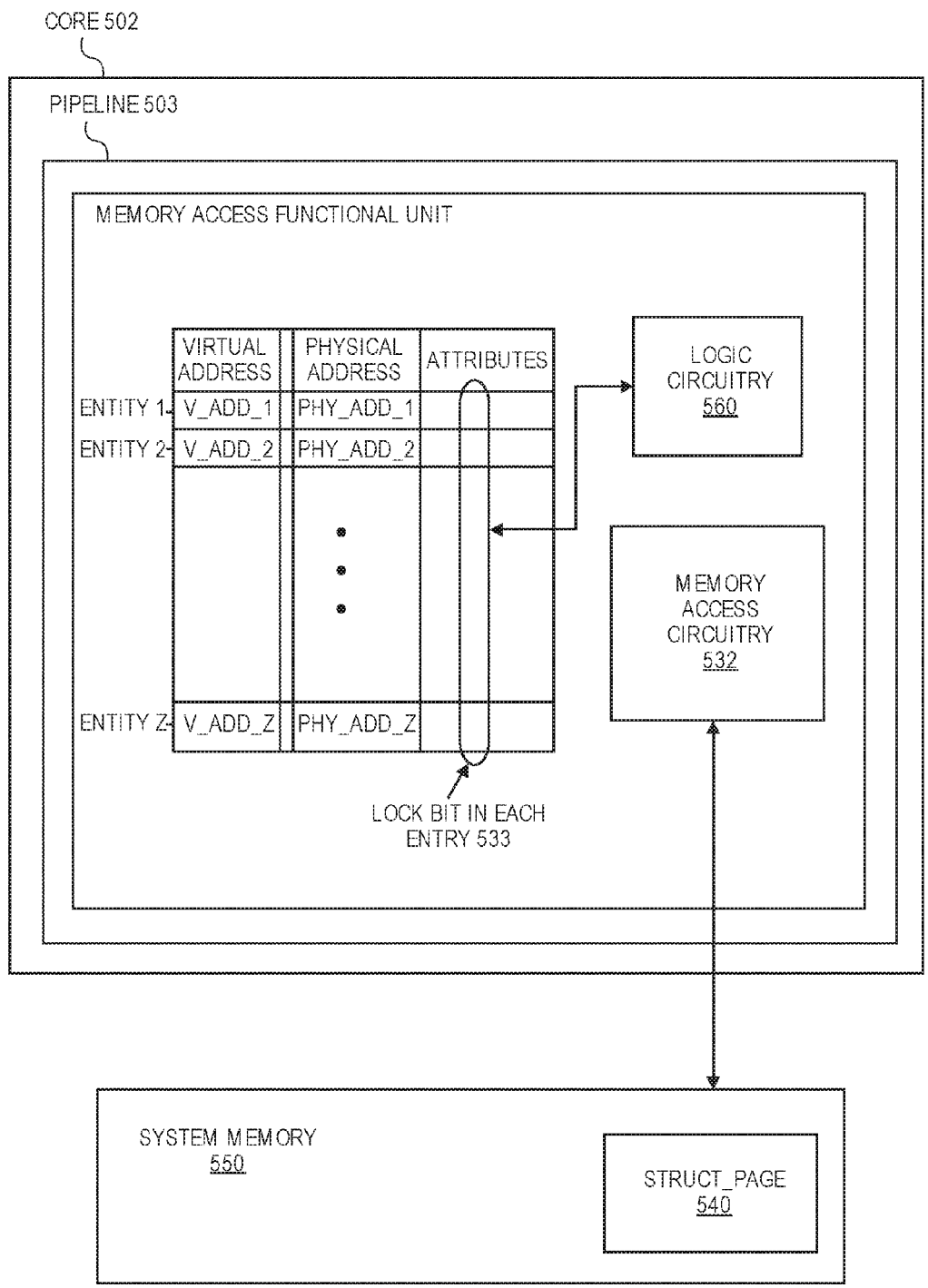
FIG. 5 shows a memory access unit having a lock bit in a TLB to lock a page of memory that has been associated with an accelerator.
Figure 6:
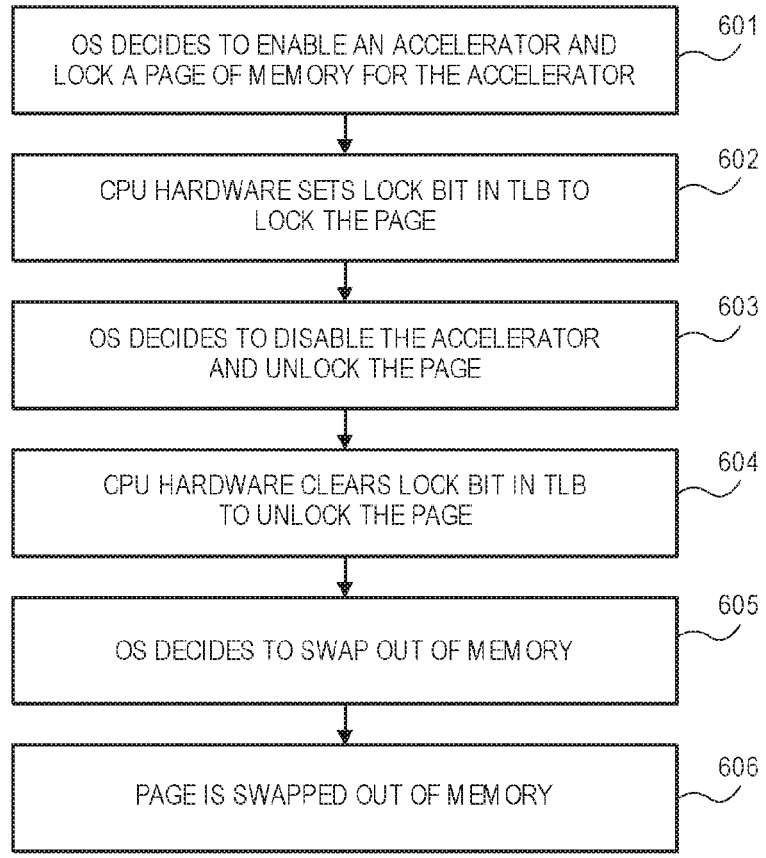
FIG. 6 shows a first process that uses the lock bit of FIG. 5.

As such, FIGS. 5 and 6 pertain to an improved approach that does not access a page's lock bit in STRUCT_PAGE 540 in system memory 550 because the page is associated with an accelerator. FIG. 5 shows an embodiment of a memory access execution unit 530 that may be implemented, for example, as one of the functional units within a pipeline 103 of a CPU core 102 of FIG. 1 and FIG. 6 shows a corresponding process that can be executed with the functional unit of FIG. 5.

As observed in FIG. 5, the memory access unit 530 is configured with a data translation look-aside buffer (TLB) 531 and memory access circuitry 532. The data TLB 531 and memory access circuitry 532 are known features in present CPUs and the role of each need not be discussed in depth here. A brief discussion is appropriate, however.

Essentially, as described above, application software calls out "virtual" addresses. Each virtual address corresponds to the upper bits of a block of system memory referred to as a "page". The underlying OS is responsible for understanding the actual size of the hardware's memory space and overseeing the mapping of the virtual addresses called out by the application software to the memory space's actual physical addresses.

The TLB 531 is a table maintained in the CPU core that contains virtual to physical address translations. When the software calls out data to be fetched from a specific virtual memory address, the TLB 531 is snooped with the virtual address being used as a look-up parameter. If there is a hit in the TLB 531, the TLB entry that was hit upon contains the physical address for the virtual memory address. The physical address is then called out by the hardware to fetch the data. Here, the physical address corresponds to the upper address bits of a "page" of system memory space.

Typically, multiple caching levels are searched for a cache line having an address that consists of: i) upper bits composed of the physical address returned from the TLB 531 snoop; and, ii) lower bits composed of the lower bits of the virtual address used as the snoop's look up parameter. If the cache line is not found in any of the caches, the address is used to fetch the cache line from system memory. If the look-up into the TLB 531 results in a miss, the memory access circuitry 532 (which may include a hardware page walker (not shown) that) issues a request to fetch the virtual to physical address translation for the associated page from cache or system memory and enters it into the TLB 531. As described above, the memory access circuitry 532 is also used for accessing STRUCT_PAGE 540 which maintains attributes for the various memory pages in the system.

As observed in FIG. 5 the TLB 531 includes various attribute data for each entry/translation in the table. An improvement as observed in FIG. 5 includes the addition of a "locked" bit 533 in the attribute data.

Referring to the process of FIG. 6, the OS first decides to enable an accelerator and lock a page of system memory space for use by the accelerator 601. However, rather than invoke the memory access circuitry to set the lock bit located in STRUCT_PAGE in system memory, the hardware instead merely sets the lock bit in the TLB 602. As such no access to system memory is made to "lock" the page upon the accelerator being enabled.

The manner in which the lock bit is set in the TLB may vary from implementation to implementation. According to a first approach, the OS is aware of the lock bit in the TLB and OS source code calls out the setting of the lock bit in the TLB explicitly.

According to a second approach, the OS is unaware of the lock bit in the TLB but a compiler that compiles OS program code for execution of the OS on the hardware is aware of the lock bit in the TLB. As such, the compiler is "smart enough" to construct object code that sets the lock bit in the TLB when it compiles OS source code that attempts to set the lock bit in STRUCT_PAGE in system memory response to the enablement of an accelerator.

According to either of the first or second approaches, the general purpose pipeline 503 of a CPU core 502 may include logic circuitry 560 to execute an instruction PGLOCK X Y that sets the lock bit in the TLB 531. Here, X is the virtual address of the page to be locked and Y is a binary input operand where, for example, Y="1" causes the logic circuitry 560 to set the lock bit in the entry in the TLB for the virtual address, or, Y="0" causes the logic circuitry 560 to clear the lock bit in the entry in the TLB for the virtual address.

In another approach, the OS and the compiler are unaware of the lock bit in the TLB. Here, logic circuitry 560, instead or responding to an explicit instruction, is designed to automatically flag an attempt by the memory access circuitry 532 to the lock bit in STRUCT_PAGE for a page that is associated with an accelerator that is enabled or will imminently be enabled. In response to the detection of these conditions, logic circuitry 560 automatically sets the lock bit in the TLB entry for the page targeted by the attempted TRUCT_PAGE access.

For any of these approaches, if the TLB entry for the targeted page is not in the TLB, the memory access circuitry 532 (including a hardware table walker within the memory access circuitry 532) may first fetch the entry from system memory and store it in the TLB. The lock bit of the entry for the newly created entry in the TLB 531 is set to the appropriate value.

Continuing with a discussion of the process of FIG. 6, upon a subsequent OS decision to unlock the page because the accelerator is being disabled 603, logic circuitry 560 clears the lock bit in the TLB 604. Any of the various implementation approaches discussed just above for the setting of the bit may also be used to clear the lock bit. Comparing the process of FIG. 6 with the process of FIG. 4, note that the process of FIG. 6 avoids a pair of inefficient accesses to system memory unlike processes 403 and 406 of FIG. 4.

After the OS's decision 603 to unlock the page and the associated lock bit in the TLB is cleared 604, the OS targets the page 605 as a candidate page to swap out of system memory.

In an implementation where the OS is aware of the page lock entry in the TLB, the OS calls out an instruction to read the TLB entry's contents, or at least the lock bit portion of the entry (the read instruction may include the page's virtual address as an input operand so the correct entry in the TLB is identified). With the TLB read data revealing that the lock bit is not set, the OS understands that the page is not locked and goes forward with the swapping out of the page without objection from the hardware 606.

Alternatively, a compiler may flag OS source code written to access STRUCT_PAGE 540 to read the status of the lock bit and instead impose into the object code an instruction to read the lock bit value from the TLB for the corresponding virtual address rather than from STRUCT_PAGE.

If the neither the OS nor a compiler is aware of the lock bit in the TLB, the OS may call out one or more instructions designed to access STRUCT_PAGE 540 to see if the lock bit is set. Again, the address for the correct STRUCT_PAGE location may be calculated by translating the page's virtual address to its PHYS_ADDR and combining that with the contents of MEMMAP. In a further embodiment, the MEMMAP value is kept within a control register of the associated CPU core rather than being maintained by the OS. Besides a possible speedup of the STRUCT_PAGE address calculation, the storage of MEMMAP in a control register rather than its being maintained by the OS permits the hardware (e.g., logic circuitry 560) to support a more generic STRUCT_PAGE access instruction that automatically fetches MEMMAP from the control register and combines it with PHYS_ADDR (e.g., rather than the OS object code calling a sequence of instructions to perform the calculation) to produce the correct STRUCT_PAGE location. Alternatively or in combination, storing MEMMAP in a control register avoids the OS having to maintain or view it. Here, logic circuitry 560 within the CPU core hardware may automatically flag the attempted access, and, instead, squash the external attempt to system memory in favor of reading the value of the lock bit from the TLB.

Alternatively to any of these options, the OS, compiler and CPU may not impose any knowledge of the lock bit in the TLB and may simply permit access to system memory and read the lock bit in STRUCT_PAGE. Again, MEMMAP may be read from a control register by the CPU hardware to automatically calculate the correct STRUCT_PAGE location.

In the case where some intelligence is utilized to read the value of the lock bit in the TLB and present that value to the OS, the OS will understand that the page is unlocked and will move forward with the swapping out of the page 606. In the case where the OS is permitted to access the value of the lock bit in STRUCT_PAGE in system memory, note that the avoidance of the initial setting the lock bit in system memory at procedure 602 causes the OS to receive a correct reading from the lock bit in STRUCT_PAGE (i.e., that the page is not locked). As such, the OS will correctly go forward with swapping the page out of system memory 606.

As part of the standard swapping out process 606, the OS calls out a TLB_FLUSH instruction to flush the entry for the page from the TLB. Because the lock bit in the entry in the TLB for the page is not set, the entry is flushed without any objection from the CPU core hardware.

Figure 7:
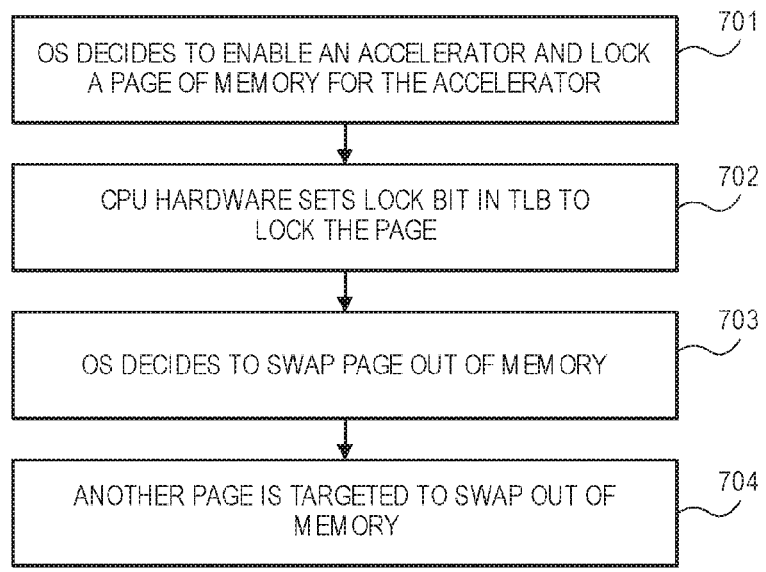
FIG. 7 shows a second process that use the lock bit of FIG. 5.

FIG. 7 shows another process, in contrast to the process of FIG. 6, in which the OS targets the page to be swapped out before the page's associated accelerator is disabled. As such, in this case, the OS attempts to swap out a page whose lock bit is set in the TLB but is not set in STRUCT_PAGE in system memory.

Here, processes, 701 and 702 set the lock bit in the TLB entry for the page so as to avoid an expensive system memory access to STRUCT_PAGE as described previously with respect to processes 601, 602 of the flow diagram of FIG. 6. After the lock bit is set, however, the OS decides to swap the page out of system memory 703. In this case, the lock bit is still set because, for instance, the accelerator associated with the page is still in use or has not yet been otherwise disabled.

As before with respect to FIG. 6, in an implementation where the OS is aware of the page lock entry in the TLB, the OS calls out an instruction to read the TLB entry's contents (the read instruction may include the page's virtual address as an input operand). With the read data revealing that the lock bit is set, the OS understands that the page is locked and identifies another page to swap out of system memory.

Alternatively, a compiler may flag OS source code written to access STRUCT_PAGE and instead impose into the object code an instruction to read the lock bit value in the TLB. Again the OS will understand that the lock bit is set and identify another page to swap out of memory.

If neither the OS or compiler is aware of the lock bit in the TLB, the OS may call out one or more instructions designed to access STRUCT_PAGE to see if the lock bit is set (e.g., again, by translating the page's virtual address to its PHYS_ADDR and combining that with the contents of MEMMAP). Here, logic 560 within the CPU core hardware may automatically flag the attempted access to the lock bit in the STRUCT_PAGE data structure in system memory, and, instead, read the value of the lock bit in the TLB and return that value to the OS.

Alternatively to any these options, the OS, compiler and CPU may not impose any intelligence and simply permit access system memory and read the lock bit from STRUCT_PAGE 540. Again, at least the MEMMAP value may be kept in a control register rather than being maintained by the OS so that the correct location in STRUCT_PAGE 540 may be automatically calculated in hardware.

In the case where some intelligence is utilized to read the value of the lock bit from the TLB and present that value to the OS, the OS will understand that the page is locked and will identify another page to swap out of system memory 704.

In the case where access the value of the lock bit in STRUCT_PAGE 540 in system memory is permitted, note that the avoidance of the initial setting of the lock bit in system memory at procedure 702 causes the OS to receive an incorrect reading from the lock bit in STRUCT_PAGE (i.e., that the page is not locked). As such, the OS will incorrectly assume that it is permissible to swap the page out of system memory.

Here however, as part of the standard swapping out process, the OS calls out a TLB_FLUSH instruction to flush the entry for the page from the TLB 531. Because the lock bit in the entry in the TLB 531 for the page is set, logic circuitry 560 raises some kind of objection to the FLUSH instruction (e.g., by returning a fault with descriptor specifying that the page is locked). The OS, in response to the objection by the hardware understands that the page cannot be swapped out of system memory and identifies another page in system memory to swap out 704.

Exemplary Computer Architectures

FIGS. 8-11 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 8:
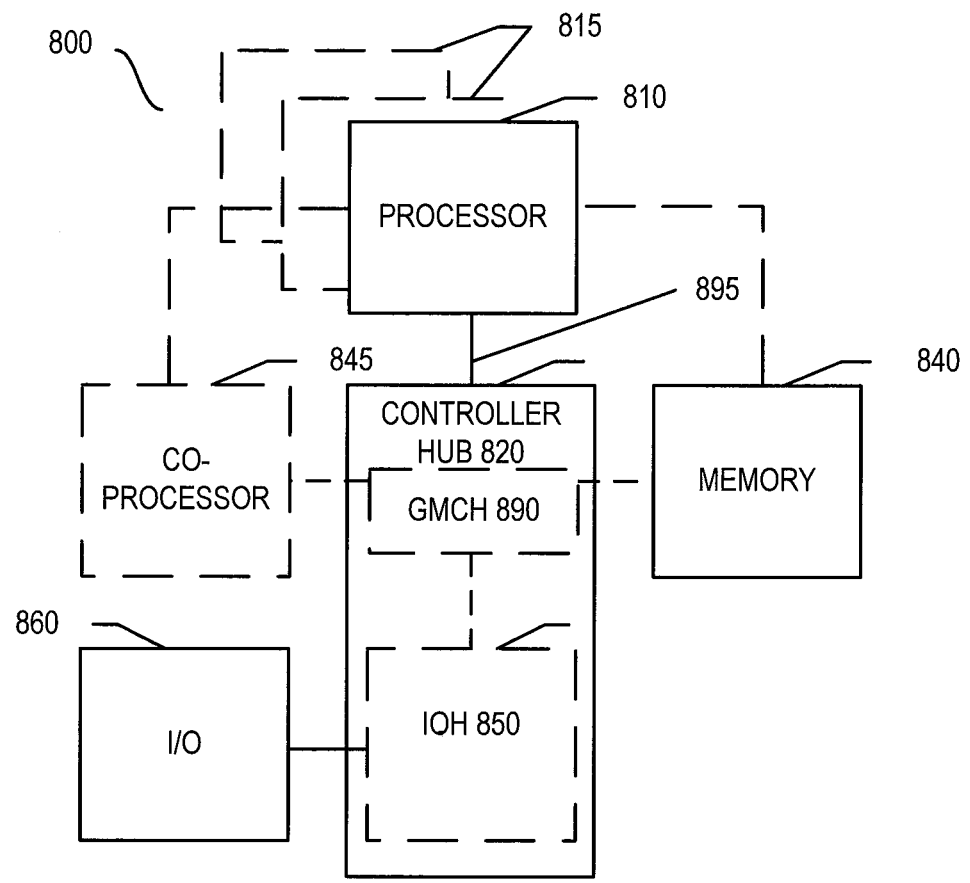
FIG. 8 shows a first computing system embodiment.

Referring now to FIG. 8, shown is a block diagram of a system 800 in accordance with one embodiment of the present invention. The system 800 may include one or more processors 810, 815, which are coupled to a controller hub 820. In one embodiment the controller hub 820 includes a graphics memory controller hub (GMCH) 890 and an Input/Output Hub (IOH) 850 (which may be on separate chips); the GMCH 890 includes memory and graphics controllers to which are coupled memory 840 and a coprocessor 845; the IOH 850 is couples input/output (I/O) devices 860 to the GMCH 890. Alternatively, one or both of the memory and graphics controllers are integrated within the processor (as described herein), the memory 840 and the coprocessor 845 are coupled directly to the processor 810, and the controller hub 820 in a single chip with the IOH 850.

The optional nature of additional processors 815 is denoted in FIG. 8 with broken lines. Each processor 810, 815 may include one or more of the processing cores described herein and may be some version of the processor 1100.

The memory 840 may be, for example, dynamic random access memory (DRAM), phase change memory (PCM), or a combination of the two. For at least one embodiment, the controller hub 820 communicates with the processor(s) 810, 815 via a multi-drop bus, such as a frontside bus (FSB), point-to-point interface such as QuickPath Interconnect (QPI), or similar connection 895.

In one embodiment, the coprocessor 845 is a special-purpose processor, such as, for example, a high-throughput MIC processor, a network or communication processor, compression engine, graphics processor, GPGPU, embedded processor, or the like. In one embodiment, controller hub 820 may include an integrated graphics accelerator.

There can be a variety of differences between the physical resources 810, 815 in terms of a spectrum of metrics of merit including architectural, microarchitectural, thermal, power consumption characteristics, and the like.

In one embodiment, the processor 810 executes instructions that control data processing operations of a general type. Embedded within the instructions may be coprocessor instructions. The processor 810 recognizes these coprocessor instructions as being of a type that should be executed by the attached coprocessor 845. Accordingly, the processor 810 issues these coprocessor instructions (or control signals representing coprocessor instructions) on a coprocessor bus or other interconnect, to coprocessor 845. Coprocessor(s) 845 accept and execute the received coprocessor instructions.

Figure 9:
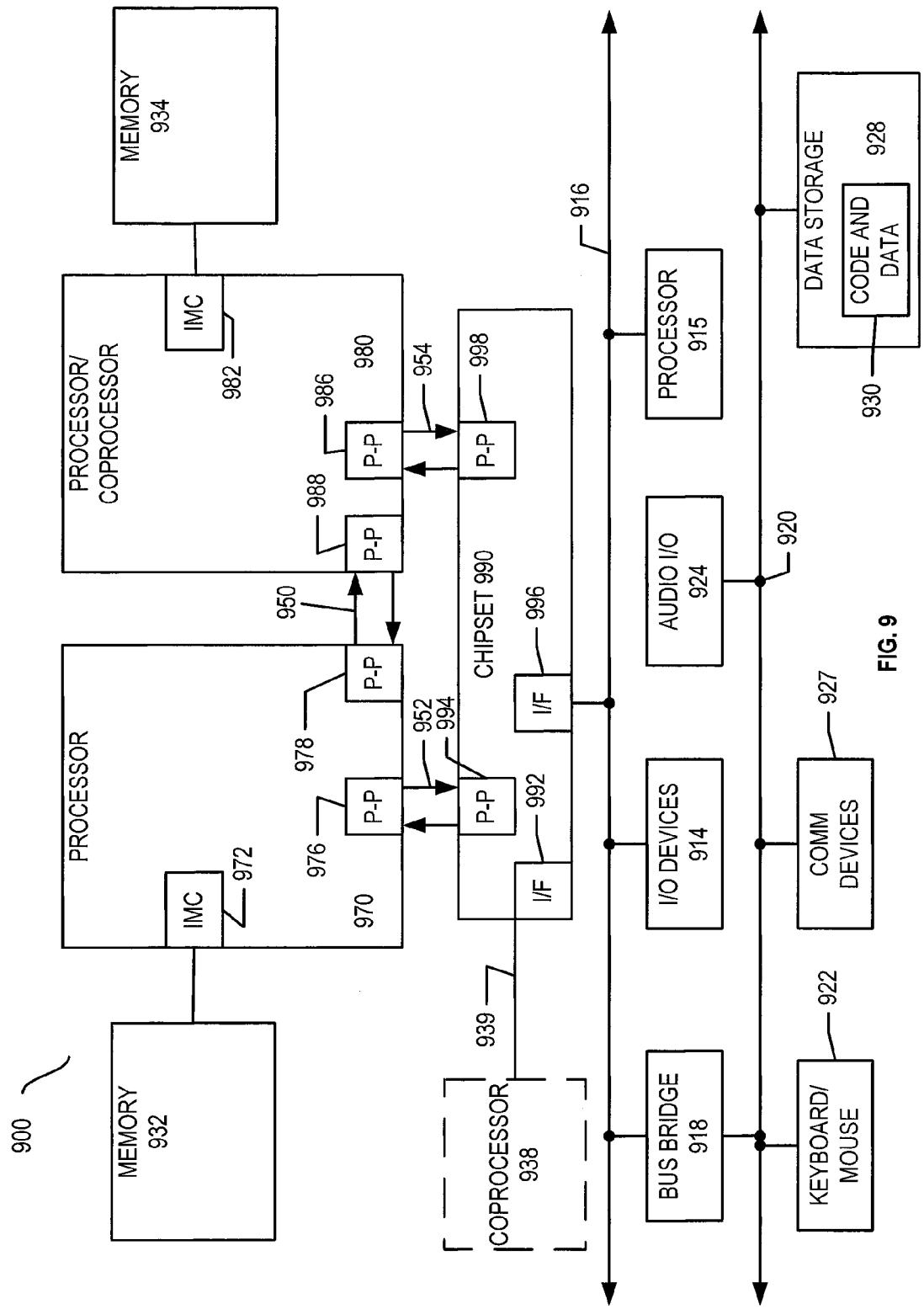
FIG. 9 shows a second computing system embodiment.

Referring now to FIG. 9, shown is a block diagram of a first more specific exemplary system 900 in accordance with an embodiment of the present invention. As shown in FIG. 9, multiprocessor system 900 is a point-to-point interconnect system, and includes a first processor 970 and a second processor 980 coupled via a point-to-point interconnect 950. Each of processors 970 and 980 may be some version of the processor 1100. In one embodiment of the invention, processors 970 and 980 are respectively processors 810 and 815, while coprocessor 938 is coprocessor 845. In another embodiment, processors 970 and 980 are respectively processor 810 coprocessor 845.

Processors 970 and 980 are shown including integrated memory controller (IMC) units 972 and 982, respectively. Processor 970 also includes as part of its bus controller units point-to-point (P-P) interfaces 976 and 978; similarly, second processor 980 includes P-P interfaces 986 and 988. Processors 970, 980 may exchange information via a point-to-point (P-P) interface 950 using P-P interface circuits 978, 988. As shown in FIG. 9, IMCs 972 and 982 couple the processors to respective memories, namely a memory 932 and a memory 934, which may be portions of main memory locally attached to the respective processors.

Processors 970, 980 may each exchange information with a chipset 990 via individual P-P interfaces 952, 954 using point to point interface circuits 976, 994, 986, 998. Chipset 990 may optionally exchange information with the coprocessor 938 via a high-performance interface 939. In one embodiment, the coprocessor 938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 990 may be coupled to a first bus 916 via an interface 996. In one embodiment, first bus 916 may be a Peripheral Component Interconnect (PCI) bus, or a bus such as a PCI Express bus or another third generation I/O interconnect bus, although the scope of the present invention is not so limited.

As shown in FIG. 9, various I/O devices 914 may be coupled to first bus 916, along with a bus bridge 918 which couples first bus 916 to a second bus 920. In one embodiment, one or more additional processor(s) 915, such as coprocessors, high-throughput MIC processors, GPGPU's, accelerators (such as, e.g., graphics accelerators or digital signal processing (DSP) units), field programmable gate arrays, or any other processor, are coupled to first bus 916. In one embodiment, second bus 920 may be a low pin count (LPC) bus. Various devices may be coupled to a second bus 920 including, for example, a keyboard and/or mouse 922, communication devices 927 and a storage unit 928 such as a disk drive or other mass storage device which may include instructions/code and data 930, in one embodiment. Further, an audio I/O 924 may be coupled to the second bus 920. Note that other architectures are possible. For example, instead of the point-to-point architecture of FIG. 9, a system may implement a multi-drop bus or other such architecture.

Figure 10:
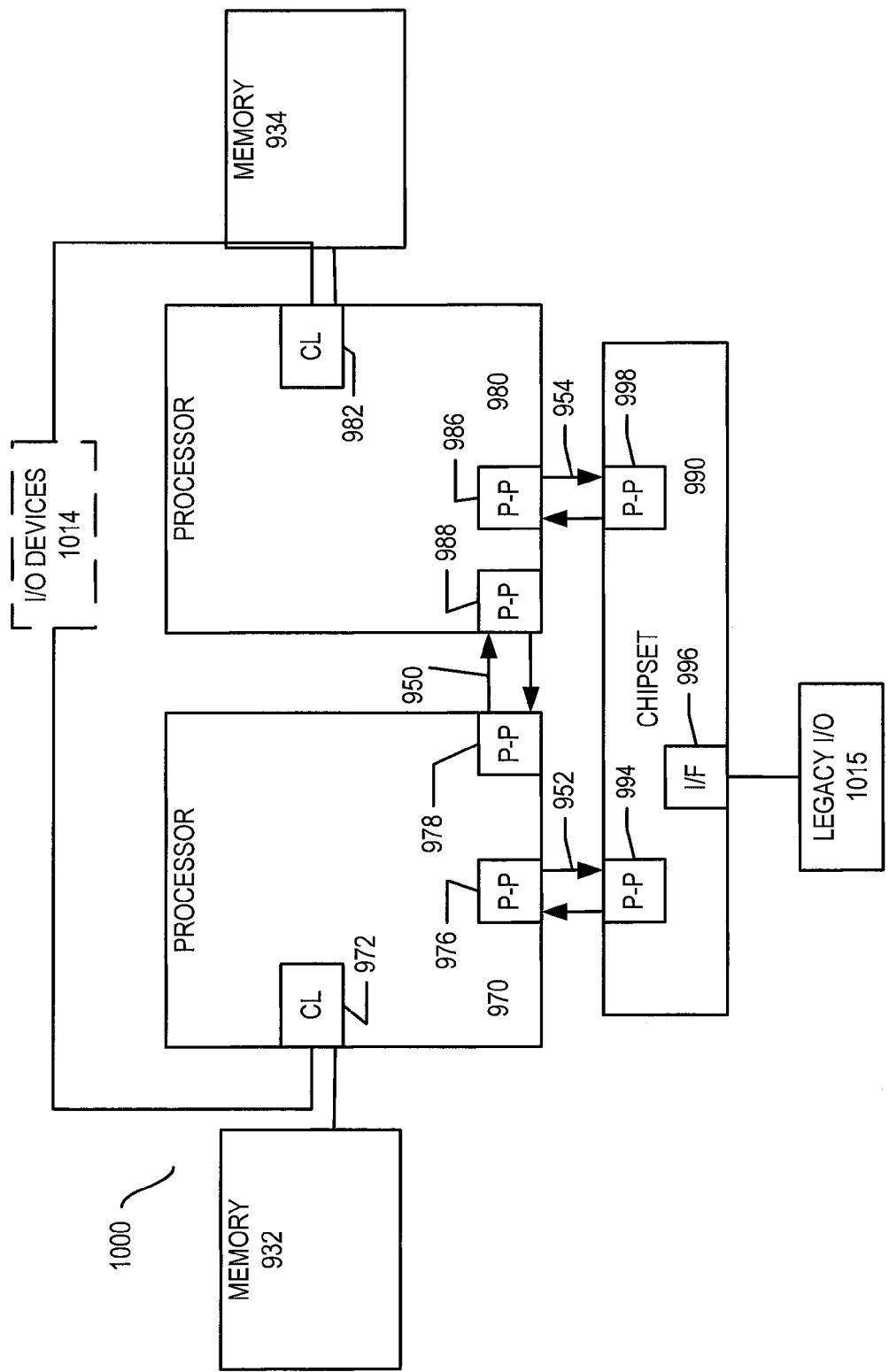
FIG. 10 shows a third computing system embodiment.

Referring now to FIG. 10, shown is a block diagram of a second more specific exemplary system 1000 in accordance with an embodiment of the present invention. Like elements in FIGS. 9 and 10 bear like reference numerals, and certain aspects of FIG. 9 have been omitted from FIG. 10 in order to avoid obscuring other aspects of FIG. 10.

FIG. 10 illustrates that the processors 970, 980 may include integrated memory and I/O control logic ("CL") 972 and 982, respectively. Thus, the CL 972, 982 include integrated memory controller units and include I/O control logic. FIG. 10 illustrates that not only are the memories 932, 934 coupled to the CL 972, 982, but also that I/O devices 1014 are also coupled to the control logic 972, 982. Legacy I/O devices 1015 are coupled to the chipset 990.

Figure 11:
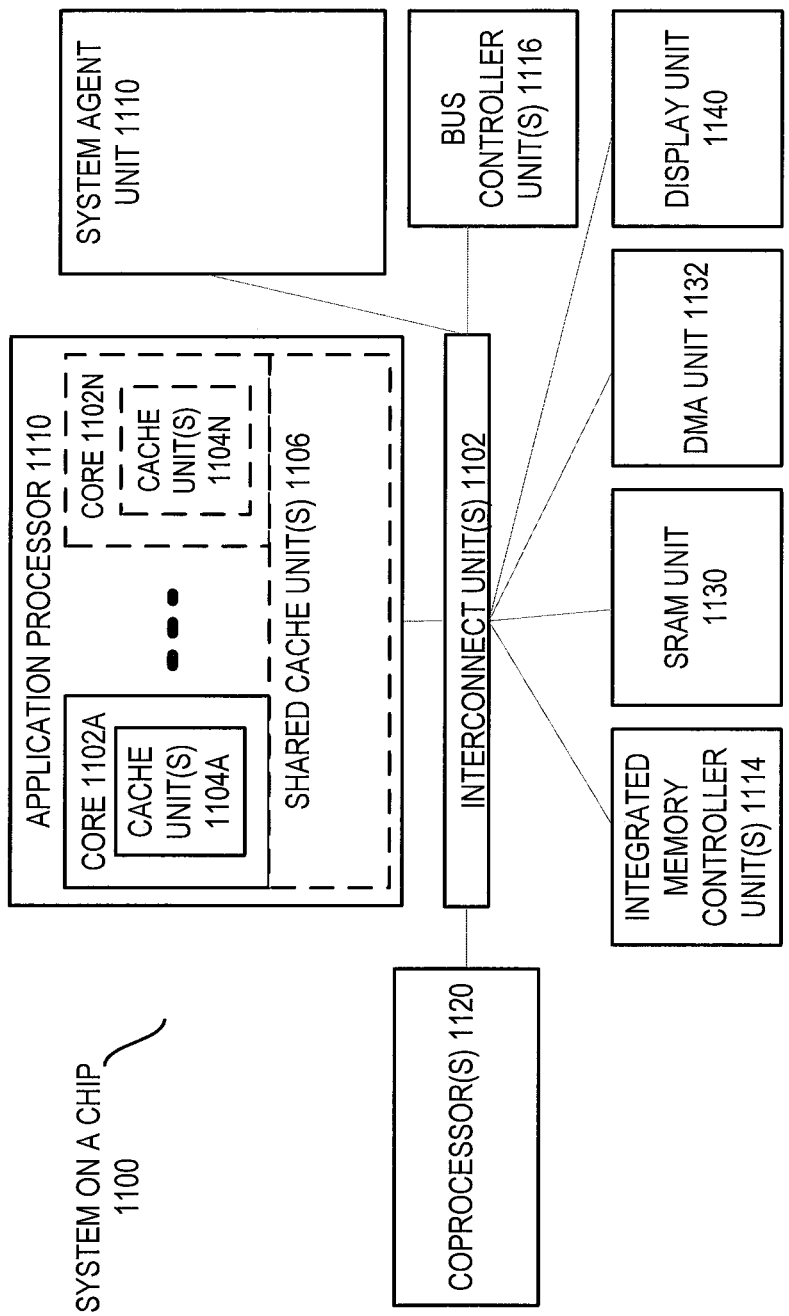
FIG. 11 shows a fourth computing system embodiment.

Referring now to FIG. 11, shown is a block diagram of a SoC 1100 in accordance with an embodiment of the present invention. Dashed lined boxes are optional features on more advanced SoCs. In FIG. 11, an interconnect unit(s) 1102 is coupled to: an application processor 1110 which includes a set of one or more cores 1102A-N and shared cache unit(s) 1106; a system agent unit 1110; a bus controller unit(s) 1116; an integrated memory controller unit(s) 1114; a set or one or more coprocessors 1120 which may include integrated graphics logic, an image processor, an audio processor, and a video processor; an static random access memory (SRAM) unit 1130; a direct memory access (DMA) unit 1132; and a display unit 1140 for coupling to one or more external displays. In one embodiment, the coprocessor(s) 1120 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 930 illustrated in FIG. 9, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (including binary translation, code morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 12 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 12 shows a program in a high level language 1202 may be compiled using an x86 compiler 1204 to generate x86 binary code 1206 that may be natively executed by a processor with at least one x86 instruction set core 1216. The processor with at least one x86 instruction set core 1216 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1204 represents a compiler that is operable to generate x86 binary code 1206 (e.g., object code) that can, with or without additional linkage processing, be executed on the processor with at least one x86 instruction set core 1216. Similarly, FIG. 12 shows the program in the high level language 1202 may be compiled using an alternative instruction set compiler 1208 to generate alternative instruction set binary code 1210 that may be natively executed by a processor without at least one x86 instruction set core 1214 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1212 is used to convert the x86 binary code 1206 into code that may be natively executed by the processor without an x86 instruction set core 1214. This converted code is not likely to be the same as the alternative instruction set binary code 1210 because an instruction converter capable of this is difficult to make; however, the converted code will accomplish the general operation and be made up of instructions from the alternative instruction set. Thus, the instruction converter 1212 represents software, firmware, hardware, or a combination thereof that, through emulation, simulation or any other process, allows a processor or other electronic device that does not have an x86 instruction set processor or core to execute the x86 binary code 1206.

What is claimed is:

1. A method, comprising:
  locking a memory page for an accelerator that is coupled to a processing core by setting a bit in attribute data of a translation look-aside buffer entry responsive to an instruction to be executed by said pipeline that includes a virtual address to be locked and a binary value for the lock bit, said translation look-aside buffer entry containing said page's virtual address to physical address translation, said translation look-aside buffer entry within a translation look-aside buffer of said processing core, said processing core and said accelerator using a same physical address to virtual address translations.

2. The method of claim 1 wherein said method avoids, in locking said memory page, setting a second lock bit for said memory page, said second lock bit kept in second attribute data within a system memory.

3. The method of claim 1 wherein said locking is performed commensurate with an enabling of said accelerator.

4. The method of claim 3 further comprising clearing said bit commensurate with a disabling of said accelerator.

5. The method of claim 4 wherein said disabling is not caused by a power off, reset or shutdown event.

6. The method of claim 5 wherein said disabling is caused by lack of an imminent need for said accelerator during normal and continuous operation of said processing core.

7. The method of claim 6 wherein said enabling is in response to activation of an application that uses said accelerator.

8. An apparatus, comprising:
  a processing core and at least one accelerator coupled to said processing core, said processing core comprising a pipeline having a translation look aside buffer, said processing core comprising logic circuitry to set a lock bit in attribute data of an entry within said translation look-aside buffer entry to lock a page of memory reserved for said accelerator, wherein said logic circuitry to set said lock bit responsive to an instruction to be executed by said pipeline that includes a virtual address to be locked and a binary value for the lock bit.

9. The apparatus of claim 8 wherein said pipeline further comprises memory access circuitry to access attributes of memory pages, said attributes stored in system memory.

10. The apparatus of claim 9 wherein said logic circuitry to detect an access to said attributes of memory pages to set a second lock bit for said page kept therein and sets said lock bit in said translation look-aside buffer in lieu thereof.

11. The apparatus of claim 8 wherein said logic circuitry is designed to raise an objection if an instruction is received for execution by said pipeline to flush said entry from said translation look-aside buffer when said lock bit is set.

12. The apparatus of claim 8 wherein said accelerator and said processing core to utilize a same virtual address to physical address translation information.

13. A machine readable medium containing program code that when processed by a processor of a computing system causes a method to be performed, said method comprising:
  detecting code to access and set a lock bit in attribute information in system memory, said attribute information containing attribute information of pages of said system memory, said lock bit to lock a page of said pages, said page reserved for an accelerator that accelerates tasks for a processing core;
  in response to said detecting, instructing said processing core to set another lock bit within a translation look-aside buffer entry of said processing core rather than access said system memory by executing an instruction to be that includes a virtual address to be locked and a binary value for the lock bit, said entry containing a virtual address to physical address translation for said page.

14. The machine readable medium of claim 13 where said instructing includes inserting an instruction into object code that explicitly calls out said setting of said another bit.

15. The machine readable medium of claim 13 wherein said instruction includes as input operand information said page's virtual address and a value to set said bit to.

16. The machine readable medium of claim 13 wherein said processing core and said accelerator use same virtual address to physical address translations.

17. The machine readable medium of claim 13 wherein said setting of said another bit is commensurate with enablement of said general purpose processing core.

18. The machine readable medium of claim 13 wherein said method further comprises:
  detecting second code to access and clear said lock bit in said attribute information in system memory;
  in response to said detecting of said second code, instructing said general purpose core to clear said another lock bit.

* * * * *